(12) United States Patent
Elving et al.

(10) Patent No.: US 10,570,931 B2
(45) Date of Patent: Feb. 25, 2020

(54) AIRCRAFT HYDRAULIC SYSTEMS HAVING SHARED COMPONENTS

(71) Applicant: Textron Innovations Inc., Providence, RI (US)

(72) Inventors: Carl Theodore Elving, Fort Worth, TX (US); Robert Paul Reynolds, Fort Worth, TX (US); David Alan Hawthorne, Fort Worth, TX (US); Carlos Alexander Fenny, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 402 days.

(21) Appl. No.: 15/466,655

(22) Filed: Mar. 22, 2017

(65) Prior Publication Data

US 2018/0274563 A1    Sep. 27, 2018

(51) Int. Cl.
*F15B 11/17*    (2006.01)
*B64C 29/00*    (2006.01)
(Continued)

(52) U.S. Cl.
CPC .............. *F15B 11/17* (2013.01); *B64C 13/36* (2013.01); *B64C 13/40* (2013.01); *B64C 13/42* (2013.01);
(Continued)

(58) Field of Classification Search
CPC ......... B64C 13/36; B64C 13/40; B64C 25/22; B64C 25/42; B64C 27/64
See application file for complete search history.

(56) References Cited

U.S. PATENT DOCUMENTS 5,100,082 A * 3/1992 Archung ................ B64D 41/00
                                                                244/76 R
5,768,973 A * 6/1998 Cochran ............... E02F 9/2225
                                                                91/516
(Continued)

FOREIGN PATENT DOCUMENTS

FR    2224657 A1    10/1974

OTHER PUBLICATIONS

Galloway, Phil. "Past, Present and Future of Hydraulic APU Start Systems." SAE Transactions, vol. 95, 1986, pp. 861-870. JSTOR, www.jstor.org/stable/44470599. (Year: 1986).*
(Continued)

*Primary Examiner* — Assres H Woldemaryam
(74) *Attorney, Agent, or Firm* — Lawrence Youst PLLC (57) ABSTRACT

A hydraulic system for an aircraft having an engine and an auxiliary power unit includes a first hydraulic subsystem including a first hydraulic pump and a first set of hydraulic-powered components in fluid communication with the first hydraulic pump. The first hydraulic pump is powered by the engine to pump shared hydraulic fluid to the first set of hydraulic-powered components. The hydraulic system includes a second hydraulic subsystem including a second hydraulic pump and a second set of hydraulic-powered components in fluid communication with the second hydraulic pump. The second hydraulic pump is powered by the auxiliary power unit to pump the shared hydraulic fluid to the second set of hydraulic-powered components. A shared return line subsystem and reservoir is in fluid communication with the first and second hydraulic subsystems to return the shared hydraulic fluid to the first and second hydraulic pumps.

19 Claims, 4 Drawing Sheets

(51) Int. Cl.
   *B64C 27/28*   (2006.01)
   *B64C 13/42*   (2006.01)
   *B64D 41/00*   (2006.01)
   *B64C 13/40*   (2006.01)
   *B64C 13/36*   (2006.01)
   *B64D 29/02*   (2006.01)
   *F15B 18/00*   (2006.01)
   *F15B 1/26*    (2006.01)

(52) U.S. Cl.
   CPC .......... *B64C 27/28* (2013.01); *B64C 29/0033* (2013.01); *B64D 29/02* (2013.01); *B64D 41/00* (2013.01); *F15B 1/26* (2013.01); *F15B 18/00* (2013.01); *F15B 2211/20507* (2013.01); *F15B 2211/20523* (2013.01); *F15B 2211/20576* (2013.01); *F15B 2211/7142* (2013.01); *Y02T 50/44* (2013.01)

(56) References Cited

U.S. PATENT DOCUMENTS

| | | | |
|---|---|---|---|
| 6,618,659 B1* | 9/2003 | Berger | E02F 3/431 172/12 |
| 2011/0303785 A1 | 12/2011 | Delloue et al. | |
| 2011/0315827 A1* | 12/2011 | Collins | B64C 29/0033 244/7 A |
| 2012/0233991 A1 | 9/2012 | Ivantysynova et al. | |
| 2014/0271204 A1* | 9/2014 | Shundo | B64C 29/0033 416/148 |
| 2016/0075430 A1* | 3/2016 | Foskey | B64C 27/473 416/1 |

OTHER PUBLICATIONS

European Search Report; Application No. EP 18155552.5; European Patent Office; dated Mar. 28, 2018.
European Exam Report; Application No. EP 18155552.5; European Patent Office; dated Apr. 16, 2018.

* cited by examiner

AIRCRAFT HYDRAULIC SYSTEMS HAVING SHARED COMPONENTS

TECHNICAL FIELD OF THE DISCLOSURE

The present disclosure relates, in general, to hydraulic systems for an aircraft and, in particular, to aircraft hydraulic systems with two or more hydraulic subsystems having shared components.

BACKGROUND

Hydraulic systems are commonly employed on aircraft to perform a variety of different operations. For example, hydraulic systems may be used to start one or more engines, move control surfaces and apply wheel brakes, among other things. Aircraft sometimes use multiple independent hydraulic circuits that employ altogether different componentry, even in cases in which independent componentry is redundant or unnecessary. The redundant use of hydraulic components increases the weight of the aircraft, adds to aircraft cost and occupies valuable space within the aircraft. Accordingly, a need has arisen for a hydraulic system having two or more hydraulic subsystems that share one or more components, thereby mitigating the aforementioned problems, among others, found in current hydraulic systems.

SUMMARY

In a first aspect, the present disclosure is directed to a hydraulic system for an aircraft having an engine and an auxiliary power unit. The hydraulic system includes a first hydraulic subsystem including a first hydraulic pump and a first set of hydraulic-powered components in fluid communication with the first hydraulic pump. The first hydraulic pump is powered by the engine to pump shared hydraulic fluid to the first set of hydraulic-powered components. The hydraulic system includes a second hydraulic subsystem including a second hydraulic pump and a second set of hydraulic-powered components in fluid communication with the second hydraulic pump. The second hydraulic pump is powered by the auxiliary power unit to pump the shared hydraulic fluid to the second set of hydraulic-powered components. The hydraulic system also includes a shared return line subsystem in fluid communication with the first and second hydraulic subsystems to return the shared hydraulic fluid from the first and second sets of hydraulic-powered components to the first and second hydraulic pumps.

In some embodiments, the hydraulic system may include a shared reservoir in fluid communication with the shared return line subsystem, the shared reservoir adapted to store the shared hydraulic fluid usable by the first and second hydraulic subsystems. In certain embodiments, the shared return line subsystem may be adapted to return the shared hydraulic fluid to the first hydraulic pump, the second hydraulic pump and the shared reservoir. In such embodiments, the shared return line subsystem may return the shared hydraulic fluid to the first hydraulic pump via the shared reservoir. In some embodiments, the first hydraulic subsystem may include a first set of pressure lines providing fluid communication between the first hydraulic pump and the first set of hydraulic-powered components, and the second hydraulic subsystem may include a second set of pressure lines providing fluid communication between the second hydraulic pump and the second set of hydraulic-powered components. In certain embodiments, one of the first or second hydraulic subsystems may be a flight essential hydraulic subsystem and the other of the first or second hydraulic subsystems may be a non-flight essential hydraulic subsystem. In such embodiments, the first hydraulic subsystem may be the flight essential hydraulic subsystem and the second hydraulic subsystem may be the non-flight essential hydraulic subsystem. In some embodiments, the flight essential hydraulic subsystem may include a flight control hydraulic subsystem and the non-flight essential hydraulic subsystem may include a ground checkout and engine starting hydraulic subsystem.

In certain embodiments, the first hydraulic subsystem may include a flight control hydraulic subsystem. In such embodiments, the first set of hydraulic-powered components of the flight control hydraulic subsystem may include at least one flight control actuator, such as a wing flight control actuator, a tail section flight control actuator or a nacelle flight control actuator, each adapted to move a flight control surface. In some embodiments, the second hydraulic subsystem may include a ground checkout and engine starting hydraulic subsystem. In such embodiments, the second set of hydraulic-powered components of the ground checkout and engine starting hydraulic subsystem may include at least one ground operation component, such as an engine start hydraulic motor. In certain embodiments, the ground checkout and engine starting hydraulic subsystem may include a ground operations isolation valve downstream of the second hydraulic pump, the ground operations isolation valve adapted to be selectively opened to allow the second hydraulic pump to provide the shared hydraulic fluid to the first set of hydraulic-powered components during ground operations. In some embodiments, the first hydraulic subsystem may be in fluid communication with the second hydraulic subsystem via the shared return line subsystem. In certain embodiments, the hydraulic system may include at least one switching valve downstream of the first and second hydraulic pumps, the at least one switching valve movable into a plurality of positions including a first position and a second position. In the first position the at least one switching valve may allow the first hydraulic pump to provide the shared hydraulic fluid to the second set of hydraulic-powered components, and in the second position the at least one switching valve may allow the second hydraulic pump to provide the shared hydraulic fluid to the first set of hydraulic-powered components. In some embodiments, at least one of the first or second hydraulic subsystems may have an operating pressure of between about 2500 and 3500 pounds per square inch.

In a second aspect, the present disclosure is directed to an aircraft including one or more engines, an auxiliary power unit and a hydraulic system. The hydraulic system includes a first hydraulic subsystem including a first hydraulic pump and a first set of hydraulic-powered components in fluid communication with the first hydraulic pump. The first hydraulic pump is powered by the one or more engines to pump shared hydraulic fluid to the first set of hydraulic-powered components. The hydraulic system includes a second hydraulic subsystem including a second hydraulic pump and a second set of hydraulic-powered components in fluid communication with the second hydraulic pump. The second hydraulic pump is powered by the auxiliary power unit to pump the shared hydraulic fluid to the second set of hydraulic-powered components. The hydraulic system also includes a shared return line subsystem in fluid communication with the first and second hydraulic subsystems to return the shared hydraulic fluid from the first and second sets of hydraulic-powered components to the first and second hydraulic pumps.

In some embodiments, the aircraft may be a tiltrotor aircraft. In certain embodiments, the tiltrotor aircraft may include a wing having first and second ends and first and second nacelles coupled to the first and second ends of the wing, respectively, the first and second nacelles each having one or more flight control surfaces. The first set of hydraulic-powered components of the first hydraulic subsystem may include a first nacelle flight control actuator adapted to control the one or more flight control surfaces of the first nacelle and a second nacelle flight control actuator adapted to control the one or more flight control surfaces of the second nacelle. In some embodiments, the tiltrotor aircraft may include a wing having first and second ends and first and second nacelles coupled to the first and second ends of the wing, respectively, the first and second nacelles each having an engine. The second set of hydraulic-powered components of the second hydraulic subsystem may include a first engine start hydraulic motor adapted to start the engine of the first nacelle and a second engine start hydraulic motor adapted to start the engine of the second nacelle.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
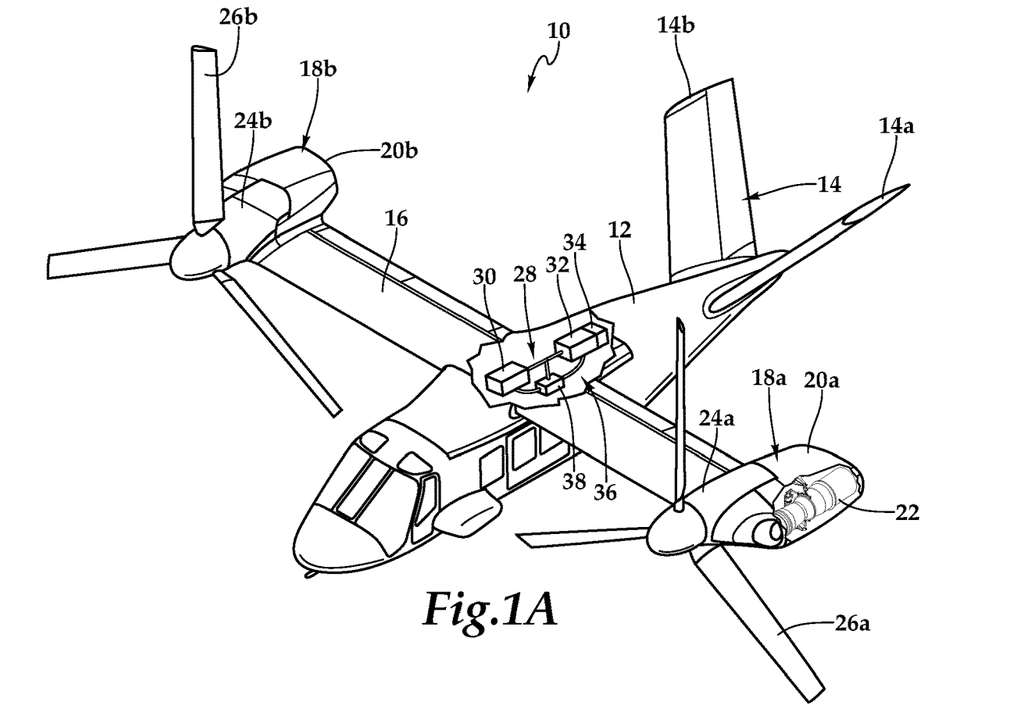
FIGS. 1A-1B are schematic illustrations of a tiltrotor aircraft utilizing a hydraulic system in accordance with embodiments of the present disclosure.
Figure 1B:
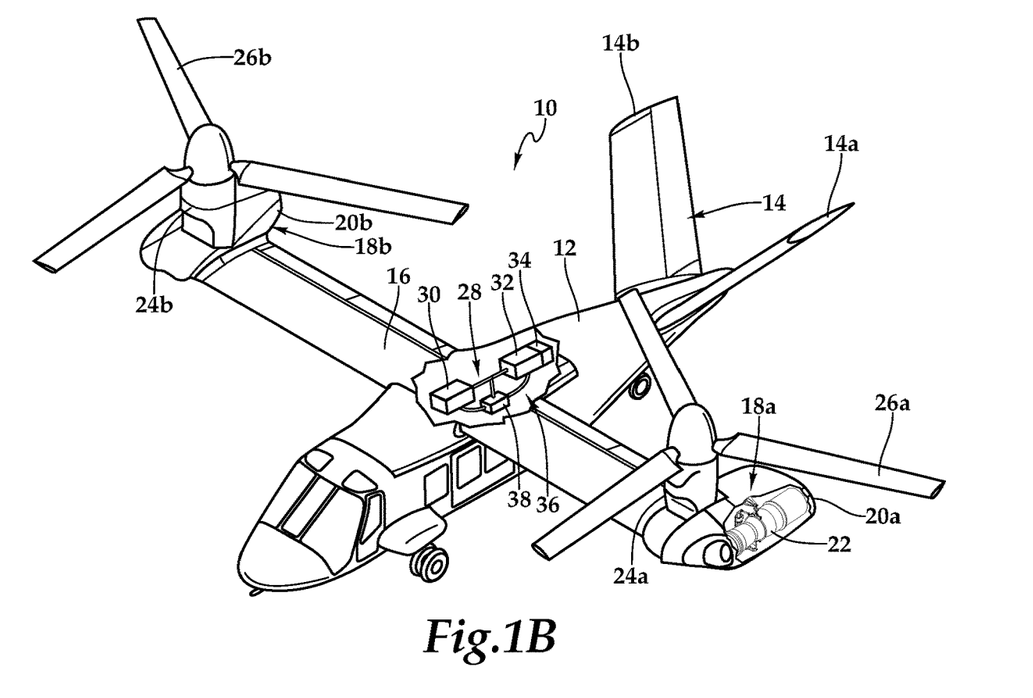

Referring to FIGS. 1A-1B in the drawings, a tiltrotor aircraft is schematically illustrated and generally designated 10. Tiltrotor aircraft 10 includes a fuselage 12 and a tail section 14 including rotatably mounted tail members 14a, 14b having control surfaces operable for horizontal and/or vertical stabilization during forward flight. A wing 16 is supported by fuselage 12. Located at outboard ends of wing 16 are propulsion assemblies 18a, 18b. Propulsion assembly 18a includes a fixed nacelle 20a that houses an engine 22 and a transmission. In addition, propulsion assembly 18a includes a pylon assembly 24a that is rotatable relative to fixed nacelle 20a between a generally horizontal orientation, as best seen in FIG. 1A, and a generally vertical orientation, as best seen in FIG. 1B. Propulsion assembly 18a also includes a proprotor assembly 26a that is rotatable relative to pylon assembly 24a responsive to torque and rotational energy provided by a rotor hub assembly and drive system mechanically coupled to engine 22 and the transmission. Similarly, propulsion assembly 18b includes a fixed nacelle 20b that houses an engine and transmission, a pylon assembly 24b that is rotatable relative to fixed nacelle 20b and a proprotor assembly 26b that is rotatable relative to pylon assembly 24b responsive to torque and rotational energy provided via a rotor hub assembly and drive system mechanically coupled to the engine and transmission housed by fixed nacelle 20b. As used herein, the term "coupled" may include direct or indirect coupling by any means, including moving and/or non-moving mechanical connections.

FIG. 1A illustrates tiltrotor aircraft 10 in airplane or forward flight mode, in which proprotor assemblies 26a, 26b are rotating in a substantially vertical plane to provide a forward thrust enabling wing 16 to provide a lifting force responsive to forward airspeed, such that tiltrotor aircraft 10 flies much like a conventional propeller driven aircraft. FIG. 1B illustrates tiltrotor aircraft 10 in helicopter or vertical takeoff and landing (VTOL) flight mode, in which proprotor assemblies 26a, 26b are rotating in a substantially horizontal plane to provide a lifting thrust, such that tiltrotor aircraft 10 flies much like a conventional helicopter. It should be appreciated that tiltrotor aircraft 10 can be operated such that proprotor assemblies 26a, 26b are selectively positioned between forward flight mode and VTOL flight mode, which can be referred to as a conversion flight mode. Even though tiltrotor aircraft 10 has been described as having one engine in each fixed nacelle 20a, 20b, it should be appreciated by those having ordinary skill in the art that other engine arrangements are possible and are considered to be within the scope of the present disclosure including, for example, alternatively or additionally having an engine housed within fuselage 12 that provides torque and rotational energy to both proprotor assemblies 26a, 26b.

Tiltrotor aircraft 10 has a hydraulic system 28 that includes hydraulic subsystems 30, 32. Hydraulic subsystems 30, 32 each include a respective hydraulic pump that provides fluid pressure to various hydraulic-powered components on tiltrotor aircraft 10. Hydraulic subsystems 30, 32 have different power sources. In particular, hydraulic subsystem 30 may be powered by either or both of the engines in the nacelles of propulsion assemblies 18a, 18b, or may be powered by an engine elsewhere on tiltrotor aircraft 10. Hydraulic subsystem 32 is powered by an auxiliary power unit 34. To reduce the weight and cost of tiltrotor aircraft 10, hydraulic subsystems 30, 32 share some components. In the illustrated example, hydraulic subsystems 30, 32 both utilize a shared return line subsystem 36 and a shared reservoir 38. Utilizing common plumbing in this manner eliminates unnecessary weight carried by aircraft that have two or more entirely independent hydraulic subsystems that share no componentry.

It should be appreciated that tiltrotor aircraft 10 is merely illustrative of a variety of aircraft that can implement the embodiments disclosed herein. Indeed, hydraulic system 28 may be utilized on any aircraft that uses hydraulics. Other aircraft implementations can include hybrid aircraft, tiltwing aircraft, quad tiltrotor aircraft, unmanned aircraft, gyrocopters, airplanes, jets, helicopters and the like. As such, those of ordinary skill in the art will recognize that hydraulic system 28 can be integrated into a variety of aircraft configurations. It should be appreciated that even though aircraft are particularly well-suited to implement the embodiments of the present disclosure, non-aircraft vehicles and devices can also implement the embodiments, including, but not limited to, automobiles or land-based vehicles.

Figure 2:
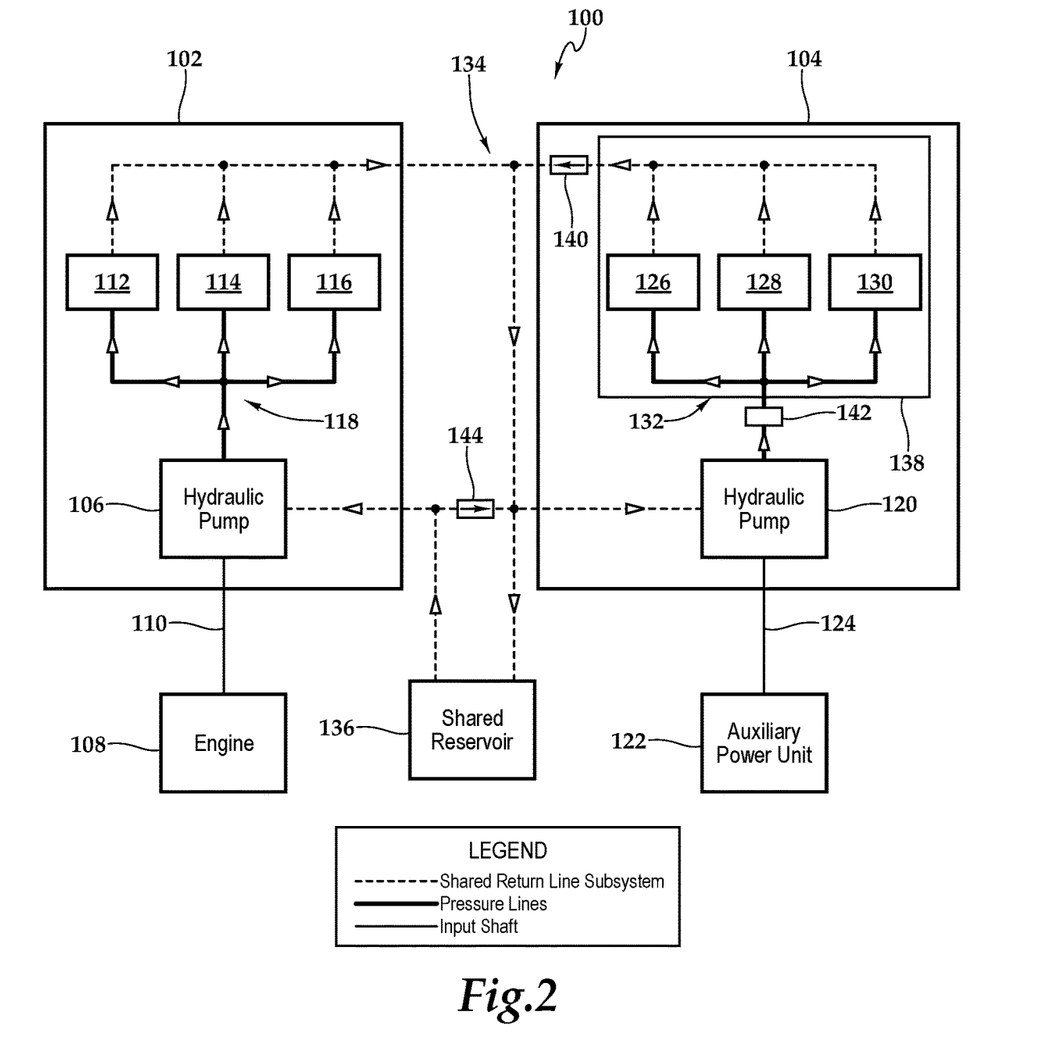
FIG. 2 is a schematic illustration of a hydraulic system having shared components in accordance with embodiments of the present disclosure.

Referring to FIG. 2 in the drawings, a hydraulic system for an aircraft is schematically illustrated and generally designated 100. Hydraulic system 100 includes hydraulic subsystems 102, 104. Hydraulic subsystem 102 includes hydraulic pump 106, which is powered by one or more engines 108 via input shaft 110 and/or an interconnect gearbox (not shown). Hydraulic subsystem 102 includes a set of hydraulic-powered components 112, 114, 116 in fluid communication with hydraulic pump 106. Hydraulic pump 106 pumps hydraulic fluid, which is shared between hydraulic subsystems 102, 104, to hydraulic-powered components 112, 114, 116 via pressure lines 118. As used herein, including in the claims, the term "set" encompasses a quantity of one or more. Hydraulic subsystem 104 includes hydraulic pump 120, which is powered by auxiliary power unit 122 via input shaft 124. In some embodiments, auxiliary power unit 122 may be an electrically-startable gas-powered engine. Hydraulic subsystem 104 includes a second set of hydraulic-powered components 126, 128, 130 in fluid communication with hydraulic pump 120. Hydraulic pump 120 pumps hydraulic fluid to hydraulic-powered components 126, 128, 130 via pressure lines 132. Hydraulic pumps 106, 120 may each operate at any operating pressure, including an operating pressure in a range between 2,500 and 3,500 pounds per square inch, such as 3000 pounds per square inch. Hydraulic pumps 106, 120 may be any type of hydraulic pump, such as a variable displacement constant pressure hydraulic pump.

Hydraulic system 100 includes shared return line subsystem 134 in fluid communication with the first and second hydraulic subsystems 102, 104, thereby providing fluid communication between the first and second hydraulic subsystems 102, 104. Hydraulic system 100 also includes shared reservoir 136, which is in fluid communication with shared return line subsystem 134 and is shared by hydraulic subsystems 102, 104. Shared reservoir 136 stores hydraulic fluid that is used by first and second hydraulic subsystems 102, 104. Shared return line subsystem 134 returns the hydraulic fluid from hydraulic-powered components 112, 114, 116, 126, 128, 130 to hydraulic pumps 106, 120 and shared reservoir 136 so that the hydraulic fluid may recirculate through hydraulic system 100. In one embodiment, hydraulic subsystem 102 may be a flight essential hydraulic subsystem and hydraulic system 104 may be a non-flight essential hydraulic subsystem by which only hydraulic subsystem 102 includes hydraulic-powered components 112, 114, 116 that are essential during flight. In this embodiment, hydraulic-powered components 126, 128, 130 of hydraulic subsystem 104 may be components that are not essential during flight, but are instead used during ground operations and pre-flight checks. Partitioning the functionality of hydraulic subsystems 102, 104 in this manner may be advantageous because of the shared mode failures resulting from the use of shared components, such as shared return line subsystem 134 and shared reservoir 136. In some embodiments, hydraulic subsystems 102, 104 may be functionally and temporally independent in that each hydraulic subsystem performs different respective functions non-simultaneously. In other embodiments, hydraulic subsystems 102, 104 may be temporally independent such that they are utilized non-simultaneously, but have fully or partially overlapping functionality.

To further enhance the flexibility of hydraulic system 100, one or more valves or other hydraulic components (not shown) may be employed to allow hydraulic pump 106 to power hydraulic-powered components 126, 128, 130 and/or hydraulic pump 120 to power hydraulic-powered components 112, 114, 116. Thus, in the example in which hydraulic-powered components 112, 114, 116 are flight essential components, such as flight control actuators, the fluid pressure produced by hydraulic pump 120 may be diverted to hydraulic-powered components 112, 114, 116 in certain circumstances, such as in an emergency or during ground operations. While hydraulic system 100 is illustrated as including two hydraulic subsystems 102, 104, in other embodiments hydraulic system 100 may include three or more hydraulic subsystems that share shared return line subsystem 134, shared reservoir 136 or other components. Previous aircraft that have employed multiple hydraulic subsystems do so in a way that each hydraulic subsystem is completely independent of one another with no component overlap, thus increasing the weight, cost and volume of the overall hydraulic system. By reducing the need for multiple reservoirs and independent plumbing, the illustrative embodiments mitigate such disadvantages.

In addition, hydraulic subsystem 104 may be an isolated hydraulic subsystem 138 that is isolated from the remainder of hydraulic system 100, including hydraulic subsystem 102, so that a failure in hydraulic subsystem 104 does not affect the remainder of hydraulic system 100, including any flight essential hydraulic subsystems. The isolation of hydraulic subsystem 104 may be implemented using check valve 140, selector valve 142 and/or other components. Selector valve 142 may be opened or closed depending on whether hydraulic subsystem 104 is being utilized. In some embodiments, shared return line subsystem 134 may include check valve 144 so that hydraulic fluid used by hydraulic-powered components 112, 114, 116, 126, 128, 130 may be returned either directly to hydraulic pump 120 or indirectly to hydraulic pump 120 via shared reservoir 136, while hydraulic fluid is returned to hydraulic pump 106 via shared reservoir 136.

Figure 3:
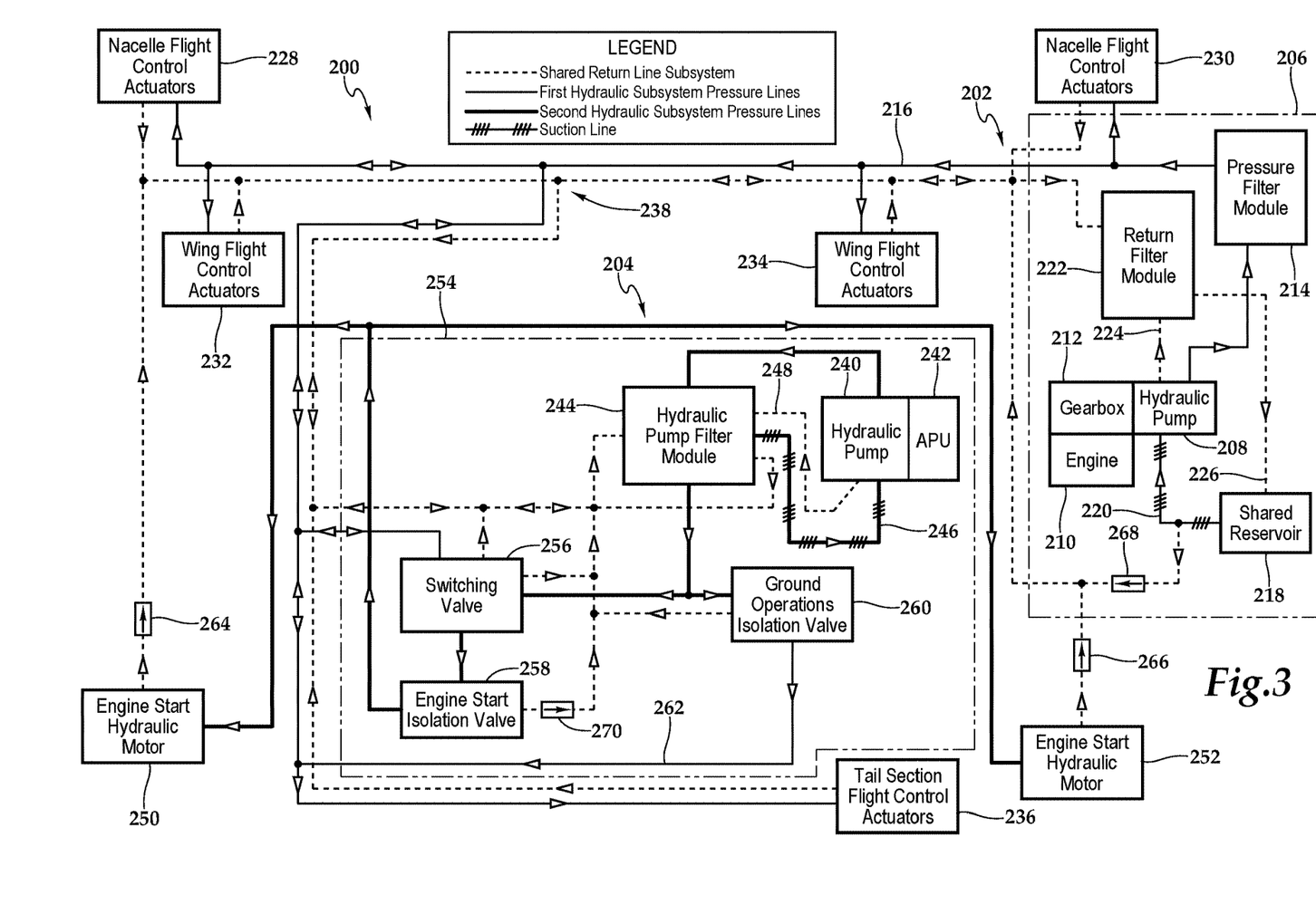
FIG. 3 is a schematic illustration of a hydraulic system having shared components in accordance with embodiments of the present disclosure.

Referring to FIG. 3 in the drawings, a hydraulic system for an aircraft is schematically illustrated and generally designated 200. Hydraulic system 200 includes a flight control hydraulic subsystem 202, which is a flight essential hydraulic subsystem, and a ground checkout and engine starting hydraulic subsystem 204, which is a non-flight essential hydraulic subsystem. Flight control hydraulic subsystem 202 includes a hydraulic power generation circuit 206 that includes hydraulic pump 208 powered by engine 210 via gearbox 212. Hydraulic pump 208 provides hydraulic pump pressure to pressure filter module 214, through which system pressure is provided to pressure lines 216. In one example, pressure filter module 214 may be equipped with a pressure transducer that supports a cockpit indication of system pressure and a mechanical delta pressure indicator that provides an indication of a dirty filter. Hydraulic system 200 includes shared reservoir 218, which stores hydraulic fluid and is in fluid communication with both flight control hydraulic subsystem 202 and ground checkout and engine starting hydraulic subsystem 204. Hydraulic pump 208 may receive hydraulic fluid from shared reservoir 218 via hydraulic pump suction line 220.

Hydraulic pump 208 may be in fluid communication with a return filter module 222 via a hydraulic pump case drain line 224. Return filter module 222 includes system and pump case drain fluid filters. Return filter module 222 may also be equipped with a temperature sensor that supports a cockpit indication of system fluid temperature as well as filter mechanical delta pressure indicators for both the return and case drain filters. The delta pressure indicators may provide an indication of a dirty filter. Hydraulic fluid may be returned to shared reservoir 218 from return filter module 222 via reservoir inlet line 226.

The hydraulic-powered components of flight control hydraulic subsystem 202 include nacelle flight control actuators 228, 230, wing flight control actuators 232, 234 and tail section flight control actuators 236. The nacelle flight control actuators 228, 230 may be used to control a pylon conversion actuator on the nacelles of a tiltrotor aircraft to change between VTOL and forward flight mode, as described in FIGS. 1A-1B. Wing flight control actuators 232, 234 may control one or more flight control surfaces on a wing of an aircraft, such as wing 16 illustrated in FIGS. 1A-1B. Tail section flight control actuators 236 may be used to control one or more flight control surfaces on the tail section of an aircraft, such as tail members 14a, 14b of tail section 14 illustrated in FIGS. 1A-1B. Indeed, the flight control actuators of flight control hydraulic subsystem 202 may control any flight control surface, such as ailerons, flaperons, spoilers, elevators, rudders, ruddervators or any combination thereof. Other hydraulic-powered components that may be powered by flight control hydraulic subsystem 202 include one or more rotor swashplate flight control actuators or actuators to control tail wheel steering or wheel brakes. Flight control actuators 228, 230, 232, 234, 236 may be any type of actuator, such as one or more single system linear electro-hydraulic servoactuators. In some embodiments, flight control hydraulic subsystem 202 may have a duplex or triplex redundant architecture as a safety measure in case of component failure. In addition to shared reservoir 218, hydraulic system 200 includes shared return line subsystem 238, which recirculates hydraulic fluid back to flight control hydraulic subsystem 202 and ground checkout and engine starting hydraulic subsystem 204.

Ground checkout and engine starting hydraulic subsystem 204 includes hydraulic pump 240, which is powered by auxiliary power unit 242. Hydraulic pump 240 may obtain hydraulic fluid from shared return line subsystem 238 via hydraulic pump filter module 244 and hydraulic pump suction line 246. Hydraulic pump 240 may drain into hydraulic pump filter module 244 via hydraulic pump case drain line 248. Hydraulic pump 240 pumps hydraulic fluid at a particular pressure to one or more ground operation components, such as engine start hydraulic motors 250, 252. Engine start hydraulic motors 250, 252 may include one or more engine start valves and be used to start the engines in the nacelles of a tiltrotor aircraft, such as those described in FIGS. 1A-1B. The hydraulic-powered components of both flight control hydraulic subsystem 202 and ground checkout and engine starting hydraulic subsystem 204, and in particular flight control actuators 228, 230, 232, 234, 236 and engine start hydraulic motors 250, 252, return hydraulic fluid back into shared return line subsystem 238. Shared return line subsystem 238 may then recirculate the hydraulic fluid back to hydraulic pump 208, hydraulic pump 240 and/or shared reservoir 218.

Engine start circuit 254 of ground checkout and engine starting hydraulic subsystem 204 may include one or more control valves and dedicated high-pressure routings to provide fluid power to engine start hydraulic motors 250, 252. Ground checkout and engine starting hydraulic subsystem 204 may power engine start hydraulic motors 250, 252 when switching valve 256, engine start isolation valve 258 and the engine start valves at engine start hydraulic motors 250, 252 are set in appropriate positions. Switching valve 256 may also be positioned to allow fluid pressure from hydraulic pump 208 of flight control hydraulic subsystem 202 to power engine start hydraulic motors 250, 252. In some embodiments, engine start circuit 254 may be powered by a ground cart. A ground operations isolation valve 260 may be selectively opened to allow hydraulic pump 240 to provide hydraulic fluid to flight control actuators 228, 230, 232, 234, 236 via pressure line 262 during ground operations. Thus, with ground operations isolation valve 260 energized and the engines not running, hydraulic pump 240 is capable of delivering fluid pressure to flight control actuators 228, 230, 232, 234, 236 for flight control functional checks, including pre-flight checks, either when auxiliary power unit 242 is running or when ground power is connected from a hydraulic cart. In some embodiments, either or both of hydraulic power generation circuit 206 or engine start circuit 254 may utilize one or more accumulators and/or heat exchangers to fine tune the operating pressure and hydraulic fluid temperature. In some embodiments, engine start circuit 254 may be located in the fuselage of an aircraft. Flight control hydraulic subsystem 202 and ground checkout and engine starting hydraulic subsystem 204 may be isolated from one another using one or more check valves 264, 266, 268, 270, switching valve 256 or other components such that if, for example, one of the pressure lines of ground checkout and engine starting hydraulic subsystem 204 failed, then flight control hydraulic subsystem 202 would remain in a fully functional condition. By isolating the hydraulic subsystems in the aircraft from one another in this manner, the overall safety and reliability of the aircraft is improved.

Figure 4:
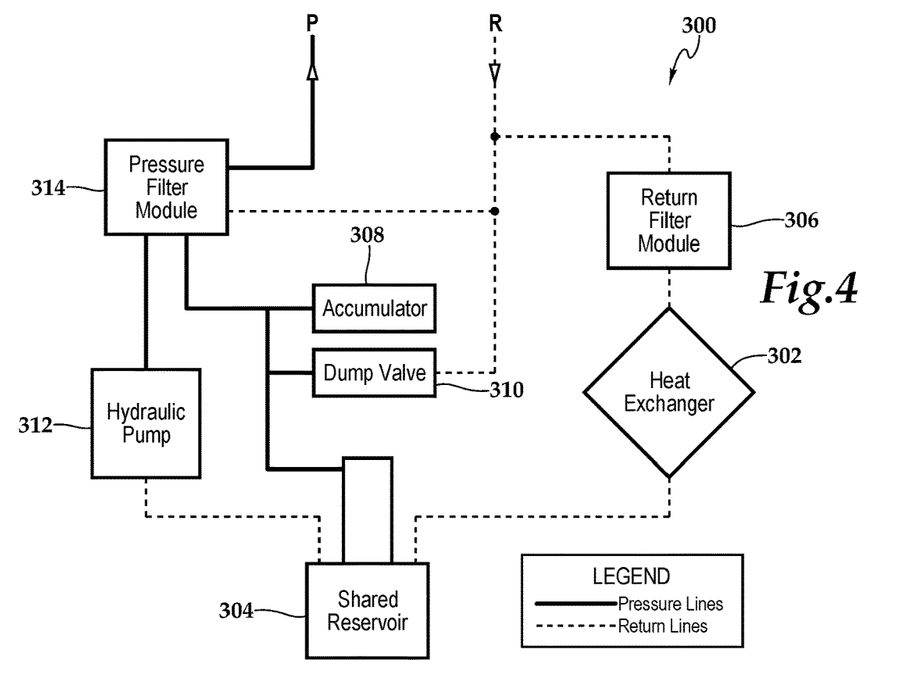
FIG. 4 is a schematic illustration of a hydraulic power generation circuit in accordance with embodiments of the present disclosure.

Referring to FIG. 4 in the drawings, a hydraulic power generation circuit is schematically illustrated and generally designated 300. Hydraulic power generation circuit 300 may be used in lieu of or in combination with hydraulic power generation circuit 206 in FIG. 3. Hydraulic power generation circuit 300 includes additional components not shown for hydraulic power generation circuit 206 in FIG. 3. In particular, hydraulic power generation circuit 300 includes heat exchanger 302, which cools hydraulic fluid flowing into shared reservoir 304 from return filter module 306. Heat exchanger 302 may be equipped with a thermostat and pressure relief valve to bypass the core when cooling the hydraulic fluid is not required or in the event that the core becomes clogged. Hydraulic power generation circuit 300 also includes a bootstrap reservoir accumulator 308 used to maintain the reservoir bootstrap return pressure. Hydraulic power generation circuit 300 also includes an accumulator dump valve 310 utilized to service accumulator 308 and relieve bootstrap pressure prior to maintenance. Dump valve 310 may also incorporate a high pressure relief feature. Hydraulic pump 312 and pressure filter module 314 may be the same as or similar to hydraulic pump 208 and pressure filter module 214 in FIG. 3, respectively.

Figure 5:
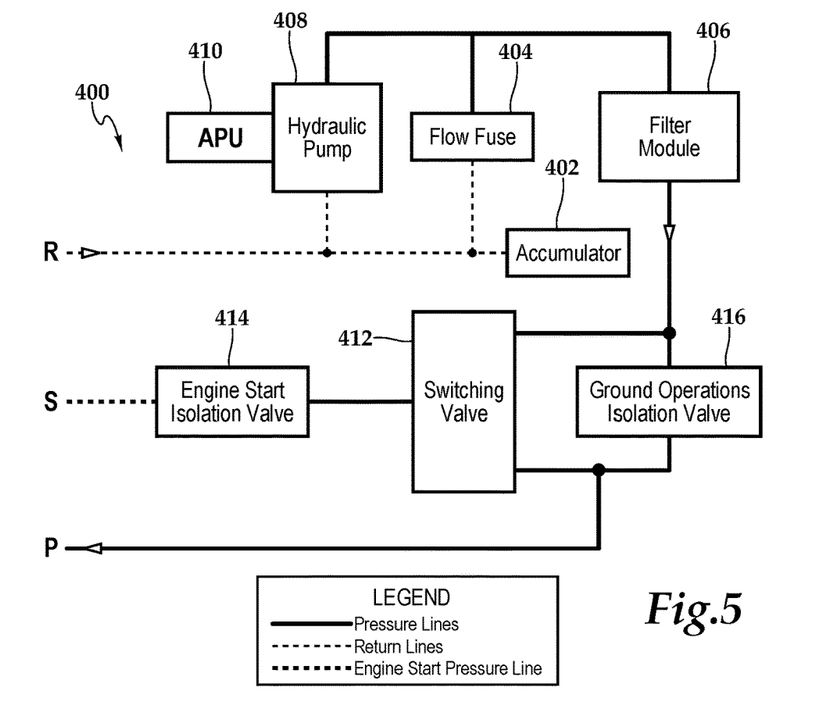
FIG. 5 is a schematic illustration of an engine start circuit in accordance with embodiments of the present disclosure.

Referring to FIG. 5 of the drawings, an engine start circuit is schematically illustrated and generally designated 400. Engine start circuit 400 may be used in lieu of or in combination with engine start circuit 254 in FIG. 3. Included in engine start circuit 400 are pump inlet accumulator 402, flow fuse 404 and filter module 406. Accumulator 402 is used to maintain pump inlet pressure greater than a pump manufacturer minimum, and flow fuse 404 is used to unload hydraulic pump 408 while auxiliary power unit 410 is starting. Switching valve 412, engine start isolation valve 414 and ground operations isolation valve 416 may be the same as or similar to switching valve 256, engine start isolation valve 258 and ground operations isolation valve 260 in FIG. 3, respectively.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A hydraulic system for an aircraft having an engine and an auxiliary power unit comprising:
 a first hydraulic subsystem including a single first hydraulic pump and a first set of hydraulic-powered components in fluid communication with the first hydraulic pump, the first hydraulic pump powered by the aircraft engine to solely pump shared hydraulic fluid to the first set of hydraulic-powered components;
 a second hydraulic subsystem including a single second hydraulic pump and a second set of hydraulic-powered components in fluid communication with the second hydraulic pump, the second hydraulic pump powered by the aircraft auxiliary power unit to solely pump the shared hydraulic fluid to the second set of hydraulic-powered components, the first set of hydraulic-powered components different from the second set of hydraulic-powered components; and
 a shared return line subsystem in fluid communication with the first and second hydraulic subsystems to return the shared hydraulic fluid from the first and second sets of hydraulic-powered components to the first and second hydraulic pumps, wherein one of the first or second hydraulic subsystems is a flight essential hydraulic subsystem and the other of the first or second hydraulic subsystems is a non-flight essential hydraulic subsystem.

2. The hydraulic system as recited in claim 1 further comprising:
 a shared reservoir in fluid communication with the shared return line subsystem, the shared reservoir adapted to store the shared hydraulic fluid usable by the first and second hydraulic subsystems.

3. The hydraulic system as recited in claim 2 wherein the shared return line subsystem is adapted to return the shared hydraulic fluid to the first hydraulic pump, the second hydraulic pump and the shared reservoir.

4. The hydraulic system as recited in claim 3 wherein the shared return line subsystem returns the shared hydraulic fluid to the first hydraulic pump via the shared reservoir.

5. The hydraulic system as recited in claim 1 wherein the first hydraulic subsystem further comprises a first set of pressure lines providing fluid communication between the first hydraulic pump and the first set of hydraulic-powered components; and
 wherein, the second hydraulic subsystem further comprises a second set of pressure lines providing fluid communication between the second hydraulic pump and the second set of hydraulic-powered components.

6. The hydraulic system as recited in claim 1 wherein the first hydraulic subsystem further comprises the flight essential hydraulic subsystem and the second hydraulic subsystem further comprises the non-flight essential hydraulic subsystem.

7. The hydraulic system as recited in claim 6 wherein the flight essential hydraulic subsystem further comprises a flight control hydraulic subsystem and the non-flight essential hydraulic subsystem further comprises a ground checkout and engine starting hydraulic subsystem.

8. The hydraulic system as recited in claim 1 wherein the first hydraulic subsystem further comprises a flight control hydraulic subsystem.

9. The hydraulic system as recited in claim 8 wherein the first set of hydraulic-powered components of the flight control hydraulic subsystem further comprises at least one flight control actuator each adapted to move a flight control surface.

10. The hydraulic system as recited in claim 9 wherein the at least one flight control actuator includes at least one of a wing flight control actuator or a tail section flight control actuator.

11. The hydraulic system as recited in claim 1 wherein the second hydraulic subsystem further comprises a ground checkout and engine starting hydraulic subsystem.

12. The hydraulic system as recited in claim 11 wherein the second set of hydraulic-powered components of the ground checkout and engine starting hydraulic subsystem further comprises at least one ground operation component.

13. The hydraulic system as recited in claim 12 wherein the at least one ground operation component further comprises at least one engine start hydraulic motor.

14. The hydraulic system as recited in claim 11 wherein the ground checkout and engine starting hydraulic subsystem further comprises a ground operations isolation valve downstream of the second hydraulic pump, the ground operations isolation valve adapted to be selectively opened to allow the second hydraulic pump to provide the shared hydraulic fluid to the first set of hydraulic-powered components during ground operations.

15. The hydraulic system as recited in claim 1 further comprising:
   at least one switching valve downstream of the first and second hydraulic pumps, the at least one switching valve movable into a plurality of positions including a first position and a second position;
   wherein, in the first position, the at least one switching valve allows the first hydraulic pump to provide the shared hydraulic fluid to the second set of hydraulic-powered components; and
   wherein, in the second position, the at least one switching valve allows the second hydraulic pump to provide the shared hydraulic fluid to the second set of hydraulic-powered components.

16. An aircraft comprising:
   one or more engines;
   an auxiliary power unit; and
   a hydraulic system comprising:
   a first hydraulic subsystem including a single first hydraulic pump and a first set of hydraulic-powered components in fluid communication with the first hydraulic pump, the first hydraulic pump powered by the one or more engines to solely pump shared hydraulic fluid to the first set of hydraulic-powered components;
   a second hydraulic subsystem including a single second hydraulic pump and a second set of hydraulic-powered components in fluid communication with the second hydraulic pump, the second hydraulic pump powered by the auxiliary power unit to solely pump the shared hydraulic fluid to the second set of hydraulic-powered components, the first set of hydraulic-powered components different from the second set of hydraulic-powered components: and
   a shared return line subsystem in fluid communication with the first and second hydraulic subsystems to return the shared hydraulic fluid from the first and second sets of hydraulic-powered components to the first and second hydraulic pumps, wherein one of the first or second hydraulic subsystems is a flight essential hydraulic subsystem and the other of the first or second hydraulic subsystems is a non-flight essential hydraulic subsystem.

17. The aircraft as recited in claim 16 wherein the aircraft further comprises a tiltrotor aircraft.

18. The aircraft as recited in claim 17 further comprising:
   a wing having first and second ends;
   first and second fixed nacelles coupled to the first and second ends of the wing; and
   first and second pylon assemblies rotatably coupled to the first and second fixed nacelles and rotatable between a vertical orientation and a horizontal orientation;
   wherein, the first set of hydraulic-powered components of the first hydraulic subsystem further comprises a first pylon conversion actuator adapted to rotate the first pylon assembly between the vertical and horizontal orientations and a second pylon conversion actuator adapted to rotate the second pylon assembly between the vertical and horizontal orientations.

19. The aircraft as recited in claim 17 further comprising:
   a wing having first and second ends; and
   first and second nacelles coupled to the first and second ends of the wing, respectively, the first and second nacelles each having an engine;
   wherein, the second set of hydraulic-powered components of the second hydraulic subsystem further comprises a first engine start hydraulic motor adapted to start the engine of the first nacelle and a second engine start hydraulic motor adapted to start the engine of the second nacelle.

* * * * *